United States Patent
Kirkendall

[15] 3,641,664
[45] Feb. 15, 1972

[54] METHOD FOR MANUFACTURING ELECTRICAL DEVICES

[72] Inventor: William D. Kirkendall, c/o Schlumberger Ltd., 277 Park Ave., New York, N.Y. 10017

[22] Filed: Oct. 22, 1969

[21] Appl. No.: 870,882

[52] U.S. Cl.................................29/592, 29/613, 156/73, 338/184
[51] Int. Cl.........................................................H01s 4/00
[58] Field of Search..................156/73; 338/160, 176, 180, 338/181, 184, 194; 29/592, 610, 613, 618

[56] References Cited

UNITED STATES PATENTS

| | | |
|---|---|---|
| 2,870,303 | 1/1959 | O'Brian..................................338/180 |
| 3,134,955 | 5/1964 | Hardison et al........................338/180 |
| 3,184,353 | 5/1965 | Balamuth et al..........................156/73 |
| 3,187,289 | 6/1965 | Rolwes..................................338/180 |
| 3,341,799 | 9/1967 | Benthuysen et al....................338/180 |
| 3,343,730 | 9/1967 | Nier et al............................156/73 X |
| 3,400,355 | 9/1968 | Benthuysen et al....................338/183 |

OTHER PUBLICATIONS

Kolb, "Designing Plastic Parts for Ultrasonic Assembly" reprinted from Machine Design, March 16, 1967, pp. 1-7

| | | |
|---|---|---|
| 3,413,590 | 11/1968 | Woods et al...........................338/180 |
| 3,444,018 | 5/1969 | Hewitt...................................156/73 |
| 3,581,388 | 6/1971 | Klug et al...............................29/592 |

Primary Examiner—Charlie T. Moon
Assistant Examiner—R. J. Shore
Attorney—William R. Sherman, Stewart F. Moore and Arnold, Roylance, Kruger and Durkee

[57] ABSTRACT

Electrical devices, such as rectilinearly adjustable potentiometers, are provided in which a hollow housing has a wall portion formed of thermoplastic polymeric material such as nylon and having an opening to accommodate a rotary adjusting member, typically a metal lead screw, the lead screw having a transverse retaining rib completely embedded in the polymeric material of the wall portion. Though the wall of the opening embraces the adjusting member, and the retaining rib is completely embedded, the adjusting member is rotatable relative to the housing. A method based on ultrasonic insertion is disclosed for making the devices.

5 Claims, 8 Drawing Figures

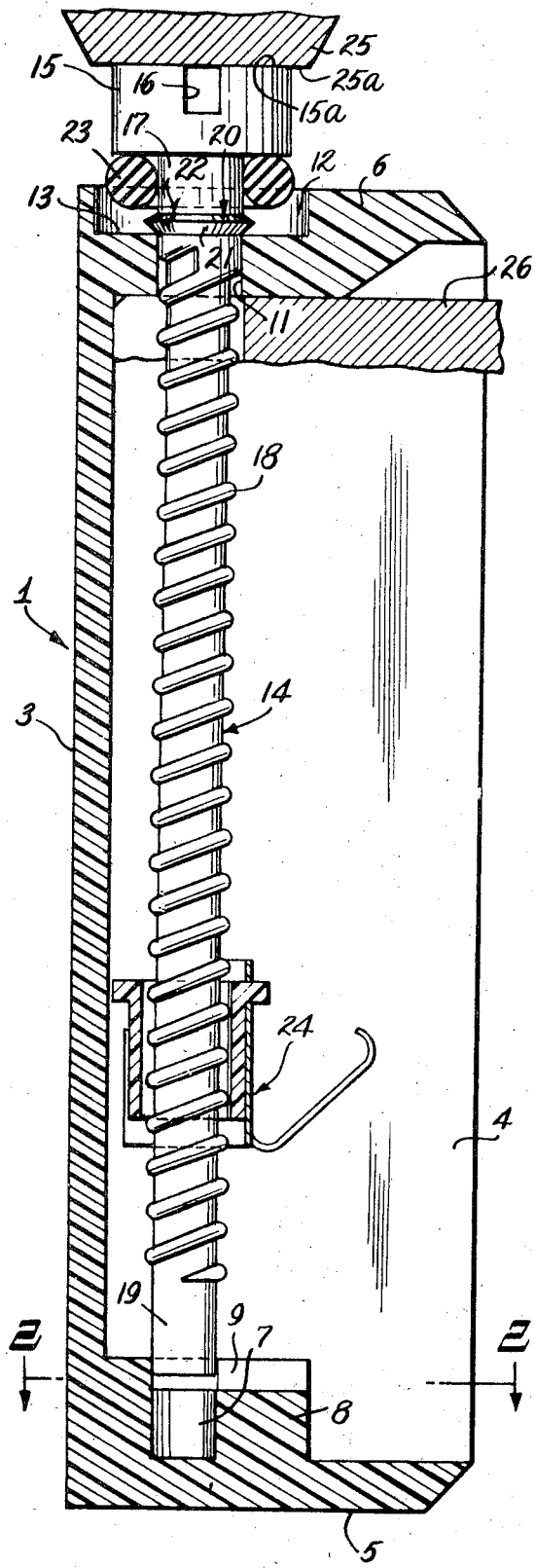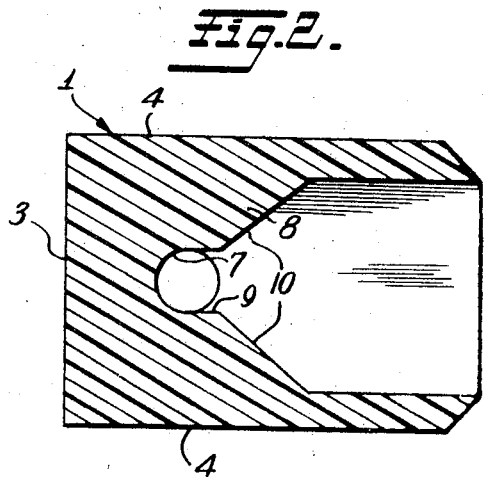

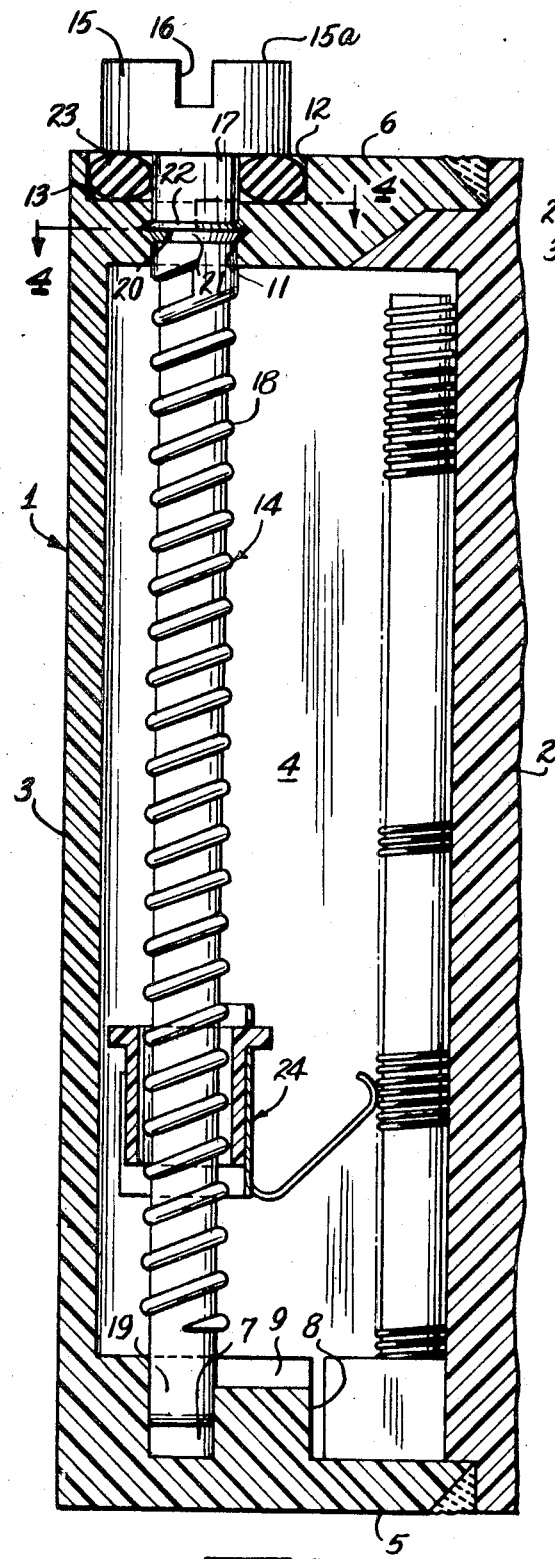
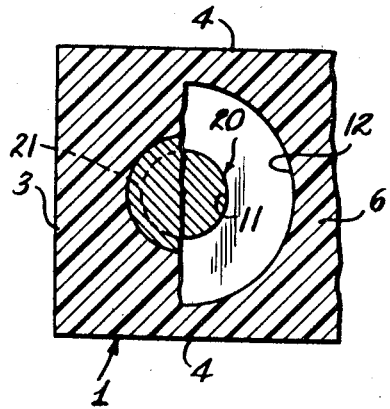
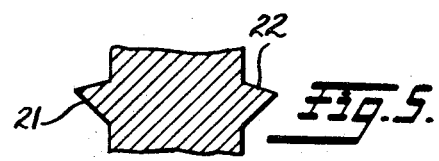
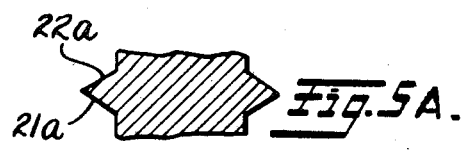
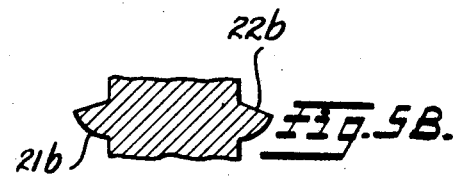
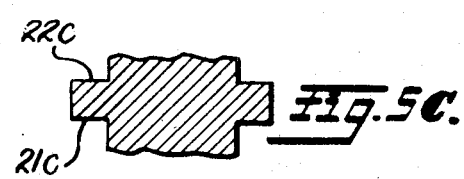

METHOD FOR MANUFACTURING ELECTRICAL DEVICES

This invention relates to housed electrical devices which include a rotary adjusting member, and to methods for producing such devices. Though more broadly applicable, the invention is particularly advantageous in connection with rectilinearly adjustable potentiometers of the kind employing a lead screw as the adjusting member.

In the prior art, those faced with the task of manufacturing such devices have sought to devise a construction in which the lead screw or other rotary adjusting member would be freely rotatable but firmly held against axial withdrawal from the housing. Numerous proposals have been adopted by the trade from time to time, and those proposals which have been most successful have required the provision of cooperating shoulders or abutment surfaces, one on the adjusting member and at least one on a portion of the housing. While widely employed in various forms, such constructions have presented difficulties, creating a continuing demand for a more satisfactory solution to the problem of locking the adjusting member against withdrawal while leaving the same free for rotation. One such difficulty lies in the complex configuration required for the housing in order to provide the shoulder or shoulders. Another, even more severe, disadvantage is the cost involved in holding the relatively close dimensional tolerances necessary to assure proper engagement between the shoulders, and in providing for the more difficult assembly procedures required.

It is accordingly a general object of this invention to devise electrical devices of the type described wherein the operating member is securely held against withdrawal, without the use of shoulders which must be manually positioned during assembly of the housing.

Another example is to provide a very simple method for manufacturing such devices.

A further object is to provide an electrical device of the type described wherein the rotary adjusting member includes a transverse annular retaining rib which is completely embedded in the wall portion of the housing through which the adjusting member extends.

Yet another object is to devise a rectilinearly adjustable potentiometer in which the housing includes a portion having spaced end walls, the head end portion of the lead screw extending through one of the end walls and the tip portion being journaled in the other end wall, the lead screw being held against axial movement relative to the housing by an annular retaining element which is a part of the lead screw and projects laterally therefrom into completely embedded relation with the one end wall. A still further object is to provide a method for producing such a potentiometer.

An additional object is the provision of an improved method for making rectilinearly adjustable miniaturized potentiometers of the kind employing a lead screw.

State generally, the invention employs housing meals having a wall portion formed of nylon or like thermoplastic polymeric material and having an opening therethrough, and a rotary adjusting member in the form of an integral metal piece comprising a portion to be accommodated by said opening, said portion having a transverse annular outwardly projecting retaining rib formed integrally therewith, said portion being disposed in said opening and the retaining rib being completely embedded in the polymeric material of the wall portion defining the opening. Such an assembly is produced by a procedure based on ultrasonic insertion of the adjusting member in a manner such that the polymeric material engaged by and immediately adjacent to the retaining rib is heat plastified and caused to flow across the rib as it advances, the heat-plastified material closing in behind the rib so that, when that material has cooled and is again solid, the polymeric material both rotatably supports the adjusting member and retains the same against axial movement. In particularly advantageous embodiment, the adjusting member has a free tip which is guided into a bearing recess in a second wall portion as the ultrasonic insertion is carried out, the embedded rib in the completed assembly serving to maintain the free tip properly engaged in the bearing recess.

In order that the manner in which the foregoing and other objects are attained in accordance with the invention can be understood in detail, a particularly advantageous embodiment thereof will be described with reference to the accompanying drawings, which form a part of this specification, and wherein:

FIG. 1 is a longitudinal sectional view of the cap of a rectilinearly adjustable potentiometer and includes the lead screw shown in side elevation and in a position preparatory to insertion;

FIG. 2 is a transverse sectional view taken on line 2—2 FIG. 1;

FIG. 3 is a view similar to FIG. 1 but with the lead screw in its final position;

FIG. 4 is a transverse sectional view taken on line 4—4, FIG. 3; and

FIGS. 5–5C are enlarged transverse cross-sectional views illustrating various configurations for the retaining rib employed in the device of FIGS. 1–4.

Turning now to the drawings in detail, FIGS. 1–4 illustrate a typical method embodiment of the invention, applied to the assembly of a miniaturized rectilinearly adjustable potentiometer in which the rotatable adjusting member is a lead screw.

The housing of the potentiometer comprises a hollow cap 1, FIG. 1 which is sealed to a base 2, FIG. 3, after the lead screw and other components have been installed. The cap 1 is formed as an integral piece from a suitable thermoplastic polymeric material exhibiting good rigidity at normal temperatures, good electrical insulating properties, and good antifriction bearing characteristics. Advantageously, cap 1 is of nylon. Cap 1 includes an elongated flat rectangular top wall 3, elongated flat rectangular sidewalls 4, and rectangular end walls 5 and 6. Adjacent top wall 3, end wall 5 is thickened and provided with a plain right cylindrical recess 7 which extends parallel to walls 3, 4 and opens toward end wall 6. As best seen in FIG. 2, the thickened portion 8 of end wall 5 is provided with a guide groove 9 which is formed in the face of portion 8 directed toward end wall 6. Groove 9 has sidewalls 10 which first converge toward the mouth of recess 7 and then extend parallel to each other and tangentially with respect to the mouth of the recess.

End wall 6 is of substantial thickness and includes a plain right cylindrical through bore 11 which extends coaxially with recess 7. At its outer end, bore 11 opens into a cylindrical recess 12, the bottom wall 13 of which extends at right angles to the axis of the through bore.

Lead screw 14 is an integral metal piece comprising a head 15, with screw driver slot 16, an intermediate right cylindrical portion 17 of a diameter such as to be slidably embraced by the wall of bore 11, a threaded main body portion 18 of a diameter such as to be capable of being passed through bore 11, and a plain right cylindrical tip 19 having a diameter such as to be slidably embraced by the wall of recess 7. At a point spaced from the adjacent end of threaded body portion 18 by a distance equal to approximately half the length of bore 11, intermediate portion 17 of the lead screw is provided with a transverse annular outwardly projecting retaining rib 20. Rib 20 is of triangular transverse cross section, so as to present surfaces 21, 22 which are frustoconical, surface 21 tapering more gradually and surface 22 more abruptly. A resiliently compressible O-ring 23 is placed between rib 20 and head 15 and is dimensioned to be accommodated by recess 12.

To commence the method, lead screw 14 is inserted, tip 19 first, through bore 11 from right to left, as viewed in FIG. 1, until surface 21 of the rib engages bottom wall 13 of recess 12. Such insertion is made in two stages, so that the movable contact unit 24 can be slipped over tip 19 and onto threaded body 18 before tip 19 approaches too near to end wall 5. The length of the portion of the leas screw to the left of rib 20, as viewed, is such that the end of tip 19 is disposed within guide groove 9 but falls short of recess 7.

The combination of cap 1 and lead screw 14 is now placed in an ultrasonic assembling apparatus with the vibration-transmitting horn 25, FIG. 1, thereof engaging the end surface 15a of lead screw head 15 and with a fixed support 26 engaging the inner face of end wall 6, the apparatus being adjusted to urge retaining rib 20 firmly against wall 13. The lead screw is adjusted to position tip 19 in precise alignment with recess 7. The apparatus is then operated to vibrate the lead screw axially at, for example, 20,000 cycles per second, while applying a force to the lead screw tending to move the same toward end wall 5. As a result of such ultrasonic vibration, frictional heat is generated at the interengaging surfaces of the metal retaining rib 20 and the thermoplastic polymeric material defining bore 11. Such heat fuses or heat plastifies the polymeric material at and immediately adjacent surface 21, allowing rib 20 to enter end wall 6 so that the lead screw moves toward end wall 5, with tip 19 entering recess 7. As the retaining rib enters wall 6, the heat-plastified polymeric material flows across the rib, closing in behind the rib, that is, in contact with surface 22 and the adjacent portion of the cylindrical surface of lead screw portion 17. The ultrasonic operation is very brief, with the time during which vibrations are applied being on the order of a second. A limit stop (not shown) of any type can be employed to stop horn 25 when rib 20 is at the desired location within end wall 6, and tip 19 is correspondingly fully inserted in recess 7, so that the parts occupy the relative positions seen in FIG. 3. The assembly of cap, lead screw and movable contact unit is then removed from the ultrasonic apparatus, the small amount of displaced thermoplastic material cooling, and regaining its fully-solid state, without requiring any special treatment or care.

In the completed cap-and-lead screw assembly, the surfaces of end wall 6 which accommodate intermediate portion 17 of the lead screw conform completely to the cylindrical configuration of that portion and to the triangular cross-sectional configuration of rib 20, so that a good low friction rotational bearing is provided and, because rib 20 is completely embedded, the lead screw is locked against axial movement in either direction relative to the cap. With the cylindrical wall of recess 7 slidably embracing tip 19, the lead screw is fully supported, yet free for rotation. As will be clear from comparing FIGS. 1 and 3, movement of lead screw 14 from its initial position, shown in FIG. 1, to its inserted position, seen in FIG. 3, places O-ring 23 under compression between head 15 and the bottom wall 13 of recess 12, the O-ring thereafter remaining under compression because the axial position of the leas screw relative to cap 1 is fixed as a result of embedment of rib 22 in the material of end wall 6.

The cap 1 is secured to base 2, after proper installation of the resistance element, return conductor, and any other components on the base, in any suitable fashion to complete the potentiometer.

While nylons are particularly advantageous as the material for cap 1, other thermoplastic polymeric materials, including particularly polystyrene, the polycarbonates, the acrylonitrile-butadiene-polystyrene copolymers, and the acetals as a class. Suitably depends primarily on adequate rigidity at normal ambient temperatures to assure good ultrasonic vibration, a softening temperature range low enough to assure that adequate heat plastification and plastic flow will result during ultrasonic vibration, and low friction characteristics.

The cross-sectional configuration of rib 20 shown in FIGS. 1 and 3, and at larger scale in FIG. 5, is particularly advantageous. It appears that the more gradually tapering surface 21, which is the leading surface of the retaining rib during insertion of the leas screw, aids in penetration of the retaining rib into the polymeric material during ultrasonic vibration while on the other hand, the more sharply tapering surface 22 offers greater resistance to withdrawal of the lead screw, after the displaced polymeric material has resolidified, and yet assures proper flow of the heat-plastified material into uniform contact with that surface and the adjacent cylindrical surface of portion 17 during insertion of the lead screw.

Though less advantageous than the configuration of FIG. 5, a triangular configuration such as that seen in FIG. 5A, with both surfaces 21a and 22a tapering at the same, or approximately the same, angle, is also suitable for the retaining rib.

Another particularly useful transverse cross-sectional configuration for the retaining rib is shown in FIG. 5B, where surface 21b is a toroidal surface, and surface 22b is a sharply tapering frustoconical surface. FIG. 5C shows another suitable configuration, the rib being of rectangular transverse cross section, so that surfaces 21c and 22c are both flat transverse annular surfaces lying at right angles to the longitudinal axis of the lead screw.

The completed assembly obtained by the method and shown in FIG. 3 has the distinct advantage that the retaining rib, being completely embedded in the polymeric material of the cap, positively precludes any undesirable shifting of the leading screw in either axial direction relative to the cap and, therefore, relative to the base when the cap has been secured to the base. And this is accomplished without use of the separate retaining washers, or complicated interfitting shoulder portions on the two housing parts, as has been the practice of the prior art. Unlike prior art arrangements, the structure of FIG. 3 is completely positive, allowing the lead screw essentially no axial freedom of movement at all. On the other hand, the complete enclosure of rib 20 and the appropriate portion of the surface of lead screw portion 17 by nylon or equivalent material, coupled with the slidable embrace of the plain right cylindrical tip 19 by the wall of recess 7, provides both a better low-friction bearing relationship, and more positive retention of the lead screw against lateral movement relative to the housing, than has heretofore been achieved.

These advantages are of special importance when producing rectilinearly adjustable potentiometers, and particularly miniaturized potentiometers such as that shown. However, the invention can as well be applied to any other device comprising a hollow housing of thermoplastic polymeric material and a rotatable adjusting member of metal.

While the method and apparatus have been shown and described in advantageous form for illustrative purposes, it will be understood by those skilled in the art that various changes and modifications can be made therein without departing from the scope of the invention as defined in the appended claims.

What is claimed is:

1. The method for manufacturing a rectilinearly adjustable resistor comprising providing a housing member formed of thermoplastic polymeric material and having spaced apart end wall portions, one of the end wall portions having a cylindrical through bore, the other of the end wall portions having a recess opening toward and coaxial with the through bore; providing a lead screw in the form of an integral metal piece comprising a head, a cylindrical portion adjacent the head and having a diameter such as to be slidably embraceable by the wall of the through bore of the one end wall portion, a threaded body portion and a cylindrical tip of a diameter to be rotatably engaged in the recess of the other end wall portion, said cylindrical portion having a transverse annular outwardly projecting retaining rib located intermediate the ends thereof; inserting the lead screw, tip first, through the through bore of the one end wall portion until said rib engaged said one end wall portion; locating said tip in alignment with the recess of the other end wall portion; ultrasonicly vibrating one of said housing member and said lead screw while simultaneously applying a force to said housing member and said lead screw in a direction to cause further insertion of the lead screw through the through bore, whereby the thermoplastic polymeric material engaged by and immediately adjacent to the retaining rib is heat plastified and caused to flow across the retaining rib as the rib penetrates said one end wall portion; terminating said steps of ultrasonicly vibrating and applying said force when said rib has reached a point intermediate the ends of said through bore and said tip is engaged in said recess; and cooling the resulting assembly to solidify the heat-plastified polymeric material to leave said retaining rib completely embedded in the polymeric material of the one end wall portion but with the lead screw rotatable about its axis relative to the housing member.

2. The method according to claim 1, wherein the surface of the annular retaining rib facing toward the tip of the lead screw is at least generally frustoconical and tapers inwardly toward the tip.

3. The method according to claim 2, wherein the retaining rib is of at least generally triangular cross section and the surface facing toward the head of the lead screw extends at an included angle, relative to the longitudinal axis of the lead screw, which is greater than the corresponding angle at which the first-mentioned surface of the rib extends.

4. The method according to claim 1, wherein the surface of the annular retaining rib facing toward the tip of the lead screw is a toroidal surface.

5. The method according to claim 1, wherein the step of locating the tip of the lead screw in alignment with the recess of the other end wall portion is accomplished by providing the other end wall portion with a lateral abutment surface at the mouth of the recess and placing the tip of the lead screw in lateral engagement therewith preparatory to the step of ultrasonicly vibrating.

* * * * *